Figure 1:
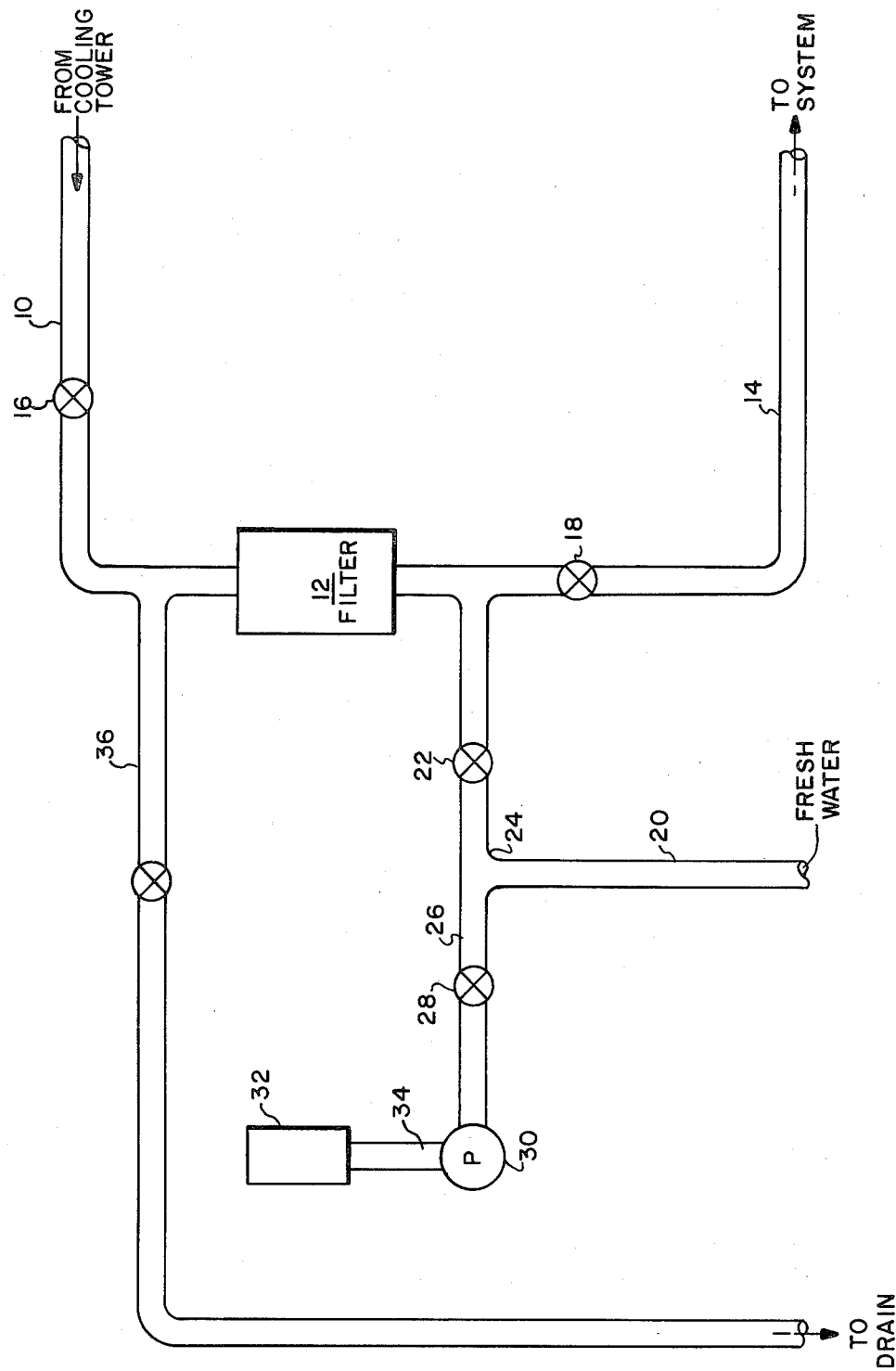

United States Patent [19]

Myers

[11] 4,177,143
[45] Dec. 4, 1979

[54] ELIMINATION OF STRAINER FOULING IN RECIRCULATING COOLING WATER SYSTEMS

[75] Inventor: Richard E. Myers, Hinsdale, Ill.

[73] Assignee: Nalco Chemical Company, Oak Brook, Ill.

[21] Appl. No.: 954,717

[22] Filed: Oct. 25, 1978

[51] Int. Cl.$^2$ ............................................. B01D 29/38
[52] U.S. Cl. ........................................ 210/82; 210/60; 210/64
[58] Field of Search ...................... 62/310; 210/60, 64, 210/82, 167

[56] References Cited

U.S. PATENT DOCUMENTS

| 3,332,871 | 7/1967 | Robinson | 210/64 X |
| 3,510,433 | 5/1970 | Pasowicz | 210/64 X |
| 3,928,197 | 12/1975 | Horan, Jr. et al. | 210/64 X |
| 3,995,443 | 12/1976 | Iverson | 62/310 X |

Primary Examiner—William A. Cuchlinski, Jr.
Attorney, Agent, or Firm—John G. Premo; Robert A. Miller

[57] ABSTRACT

A method of improving the operation of filters of the type used to filter cooling water which is used intermittently in direct heat exchange relationship to cool large office buildings and similar structures, which method comprises maintaining the filters when not in use in contact with an aqueous solution which contains a preservative amount of an industrial biocide. Also shown is a method of controlling microorganisms in the filters by using a biocide with the backwash water.

4 Claims, 1 Drawing Figure

ELIMINATION OF STRAINER FOULING IN RECIRCULATING COOLING WATER SYSTEMS

INTRODUCTION

The abstract of U.S. Pat. No. 3,995,443 set forth below describes a method for reducing the energy requirements for cooling office buildings and the like in mild climate areas:

"A process and apparatus for controlling the air temperature in buildings, particularly large multiroom buildings, which eliminates the use of conventional refrigeration units during substantial portions of the year, providing a significant reduction in energy consumption. A liquid stream is cooled in an air cooling tower outside the building by contact with the ambient or outside air, is filtered to remove contaminants, and is circulated in a cyclical flow directly between the heat exchangers or induction unit coils in the building and the cooling tower outside the building, which preferably cools the liquid substantially to the outside ambient wet bulb air temperature. The system is used when the wet bulb temperature of the outside air is low enough to provide liquid at an effective cooling temperature, preferably at or below the desired temperature of the room air, and more preferably at a predetermined liquid temperature desired at the induction units for cooling. When the liquid at the output of the cooling tower is below the desired liquid cooling temperature, a suitable proportion of return liquid from the building is caused to bypass the cooling tower and is mixed with the cooling tower liquid. Additionally, the cooling liquid is prevented from circulating through the induction unit coils in the rooms in which slight heating is desired and return air from all the rooms is mixed with fresh air and recirculated through a conventional fan back to the rooms in which heat is desired to provide heating of the room air therein without the need to use a conventional heat generation unit. This process can be employed with existing systems having refrigeration and heat generation units."

The essence of this technique is that under certain conditions of temperature and humidity, it is possible to utilize cooling tower waters in direct heat exchange relationship with the various heat exchange devices used to cool or heat the building. In this system and other similar known systems, it is obvious that cooling tower water is used on an intermittent basis throughout the year. Due to the normal contamination of cooling tower water systems of the type described in U.S. Pat. No. 3,995,443, the use of a filter to remove these contaminants is required.

Experience has shown that in many instances these filters plug with suspended solid material and must be backwashed to maintain their ability to remove solids from the system. Under certain circumstances the filters plug with biological slimes and growths which are substantially incapable of being completely removed by conventional backwash techniques. In certain cases it has been found necessary to backwash these filter systems that have been plugged with microbiological growth many times daily.

The presence of microbiological growths in these filters is surprising since most cooling towers are treated with microorganism control chemicals which inhibit and, in most instances, substantially suppress the growth of microorganisms. Even when a cooling tower is properly treated with microbiocides, the filter will still become contaminated with microbiological growths. In one instance, a cooling tower water was sampled from the tower basin. A second sample was taken from the filter which had been shut down and in non-use for a period of several weeks. The total count of the water in the filter was 10 times greater than that contained in the tower basin. This was true even though the system had been regularly treated with a commercial biocide. This is a surprising phenomena, the discovery of which forms a portion of this invention.

THE INVENTION

In accordance with the invention, I have found a method of improving the operation of filters of the type used to filter cooling water which is used intermittently in direct heat exchange relationship to cool large office buildings and similar structures, which method comprises maintaining the filters when not in use in contact with an aqueous solution which contains a preservative amount of an industrial biocide. This simple expediency of, in effect, storing the filters in the presence of a substantial quantity of microbiocide is able to prevent further plugging of these filters by microbiological growth.

I have further found that these systems may be operated more efficiently and the filters less subject to biological growth and contamination by using, along with the conventional backwash of these filters, the incorporation of a biocide into the backwash water. This particular system is best illustrated by the drawing.

THE DRAWING

With specific reference to the drawing, there is shown bypass line 10 which conducts water from the cooling tower into the filter 12 from whence it is conducted through line 14 to the heat exchangers in the building or the like. Line 10 is equipped with valve 16, whereas line 14 is equipped with valve 18. When these valves are open, water from the cooling tower runs through the filter and thence into the system. When closed, the filter is isolated and contains stagnant water. This is normally the case when the cooling tower water is used to remove heat from the normal refrigeration system used to produce chilled water or air.

In most systems, fresh water is used to backwash the filter when it becomes plugged as evidenced by a pressure drop occurring across the filter. To allow the backwash, valves 16 and 18 are closed and there is fed to the system a source of pressured fresh water through line 20 which is fitted with valve 22 and T 24. In normal operation, fresh backwash water flows through line 20 into filter 12 and from the filter through drain line 36.

In the practice of the invention, fitted into T 24 is line 26 containing valve 28, which line is connected to pump 30 which supplies biocide drawn from supply tank 32 through line 34. Thus, when valve 28 is open, biocide will be supplied to the filter 12 at any time the filter is being backwashed.

The Dosage of the Biocide

The amount of biocide used to treat the water in contact with the filter when it is not being used should be at least twice the normal dosage of the particular biocide used to treat the cooling tower water under conditions of normal operation. Thus, for instance, if chlorine were used as a tower treatment at an average dosage of 2 ppm, the amount used to treat the water which contacts the filter under storage conditions would be at least 4 ppm and would preferably be within the range of 4–10 ppm. A larger quantity of biocides may be considered as a preservative dosage. When the microbiocide is used to treat the filter during the backwash cycle, then the amount of the biocide should be at least that amount normally used to treat the tower water although, preferably, it is twice that amount.

The Biocide

In order to practice the invention, a wide variety of microbiocidal agents may be employed. Typically one might utilize such microbiocides as chlorine, ozone, chlorine-releasing agents, methylene bis thiocyanate, 2,2-dibromopropionamide, tributyl tin oxide, and a variety of biocidally active quaternary ammonium salts, particularly the fatty substituted quaternary ammonium salts of the type having biological activity. A preferred compound of this type is N-alkyl (60% $C_{14}$, 30 $C_{16}$, 5 $C_{12}$, 5% $C_{18}$) dimethyl benzyl ammonium chloride. When biocides of this type are used, the dosage should be at least 10 ppm and, preferably, within the range of 10–50 ppm. When systems are treated in accordance with the techniques suggested herein, improved efficiency of the filters used in the systems described is achieved.

Having thus described my invention, it is claimed as follows:

1. A method of improving the operation of filters of the type used to filter cooling waters which are used intermittently in direct heat exchange relationship to cool large office buildings and similar structures, which method comprises maintaining the filters when not in use in contact with water which contains a preservative amount of an industrial biocide, said preservative amount being greater than the normal dosage used to treat the cooling water under conditions of normal operation.

2. The method of claim 1 where the biocide is a fatty substituted water dispersible quaternary ammonium salt.

3. A method of improving the operation of filters of the type used to filter cooling waters which are used intermittently in direct heat exchange relationship to cool large office buildings and similar structures, which method comprises backwashing said filters with water which contains a biocidal amount of an industrial biocide, which biocide is greater than the amount normally used to treat the cooling water.

4. The method of claim 3 wherein the biocide is a fatty substituted water dispersible quaternary ammonium salt.

* * * * *